(12) United States Patent
Lee et al.

(10) Patent No.: US 11,099,803 B2
(45) Date of Patent: Aug. 24, 2021

(54) INFORMATION PROVIDING METHOD USING MOBILE DEVICE

(71) Applicants: Jaekyu Lee, Gunpo (KR); Jaelark Jung, Goyang (KR); Jaeyong Jang, Seoul (KR)

(72) Inventors: Jaekyu Lee, Gunpo (KR); Jaelark Jung, Goyang (KR); Jaeyong Jang, Seoul (KR)

( * ) Notice: Subject to any disclaimer, the term of this patent is extended or adjusted under 35 U.S.C. 154(b) by 0 days.

(21) Appl. No.: 16/426,702

(22) Filed: May 30, 2019

(65) Prior Publication Data

US 2019/0278547 A1    Sep. 12, 2019

Related U.S. Application Data

(63) Continuation of application No. 15/554,196, filed as application No. PCT/KR2016/001972 on Feb. 28, 2016, now Pat. No. 10,353,665.

(30) Foreign Application Priority Data

Mar. 1, 2015   (KR) .................. 10-2015-0028758

(51) Int. Cl.
  *G06F 3/147*       (2006.01)
  *G06Q 30/02*      (2012.01)
    (Continued)

(52) U.S. Cl.
  CPC ............ *G06F 3/147* (2013.01); *G06F 1/3206* (2013.01); *G06F 1/3215* (2013.01);
    (Continued)

(58) Field of Classification Search
  CPC ...... G06F 3/147; G06F 3/0488; G06F 21/629; G06F 21/36; G06F 1/3203;
    (Continued)

(56) References Cited

U.S. PATENT DOCUMENTS

2003/0105983 A1   6/2003   Brakmo .................. 713/320
2012/0154303 A1   6/2012   Lazaridis ................ 345/173
    (Continued)

FOREIGN PATENT DOCUMENTS

CN   201585038 U   9/2010
CN   102096879 A   6/2011
    (Continued)

OTHER PUBLICATIONS

Use iPhone (iOS 6), Bernedo, 2012; https://www.guidingtech.com/17604/use-iphone-ios-6-when-hardware-buttons-dont-work/ (Year: 2012).*
    (Continued)

*Primary Examiner* — Jianxun Yang
(74) *Attorney, Agent, or Firm* — Stein IP, LLC

(57) ABSTRACT

Provided is a method of providing information through a mobile device, in which an information providing screen is outputted only during the first activation performed within a predetermined time range designated by a user. Therefore, inconvenience resulting from repetitive outputs of the information providing screen can be resolved.

6 Claims, 2 Drawing Sheets

(51) Int. Cl.
*G09G 3/20* (2006.01)
*G06F 1/3215* (2019.01)
*G06F 1/3234* (2019.01)
*G06F 1/3206* (2019.01)
*G09G 5/14* (2006.01)
*G06F 3/0488* (2013.01)
*H04W 52/02* (2009.01)
*G06F 3/048* (2013.01)

(52) U.S. Cl.
CPC ............ *G06F 1/3265* (2013.01); *G06F 3/048* (2013.01); *G06F 3/0488* (2013.01); *G06Q 30/0241* (2013.01); *G06Q 30/0262* (2013.01); *G06Q 30/0267* (2013.01); *G09G 3/20* (2013.01); *G09G 5/14* (2013.01); *H04W 52/0229* (2013.01); *H04W 52/0254* (2013.01); *G09G 2330/022* (2013.01); *G09G 2330/026* (2013.01); *G09G 2354/00* (2013.01); *Y02D 30/70* (2020.08)

(58) Field of Classification Search
CPC ............ G06F 3/04883; G06F 3/04886; H04W 52/0229; H04W 52/0254; H04W 4/00; H04W 4/24; G06Q 30/02; H04M 2215/0192; H04M 15/00
See application file for complete search history.

(56) References Cited

U.S. PATENT DOCUMENTS

| | | | |
|---|---|---|---|
| 2014/0289683 A1 | 9/2014 | Park | 715/863 |
| 2014/0364103 A1* | 12/2014 | Marti | H04W 4/029 455/418 |
| 2015/0120458 A1* | 4/2015 | Lee | G06Q 30/0208 705/14.59 |
| 2015/0186944 A1* | 7/2015 | Forsblom | G06F 3/017 705/14.64 |

FOREIGN PATENT DOCUMENTS

| | | |
|---|---|---|
| CN | 104133628 A | 11/2014 |
| JP | 2014-239478 A | 12/2014 |
| KR | 10-1234440 B1 | 2/2013 |
| KR | 10-2013-0124854 A | 11/2013 |
| KR | 10-2015-0004305 A | 1/2015 |
| WO | WO 2011/035442 A1 | 3/2011 |
| WO | WO 2014/178513 A1 | 11/2014 |

OTHER PUBLICATIONS

International Search Report dated Jun. 10, 2016, issued by the Korean Intellectual Property Office in corresponding application PCT/KR2016/001972.
Decision to grant a patent dated Jan. 24, 2017, issued by the Korean Intellectual Property Office in corresponding application KR 10-2015-0028758.
Korean Office Action dated Jan. 15, 2016, issued by the Korean Intellectual Property Office in corresponding application KR 10-2015-0028758.
Korean Office Action dated Jul. 27, 2016, issued by the Korean Intellectual Property Office in corresponding application KR 10-2015-0028758.
IPhone-User-Guide-iOS-7.1, Apple, 2014 https://teams.unesco.org/services/mobile/Shared%20Documents/iPhone%20EN.pdf.
How to turn off alert and banner notifications, Meinck, 2014 http://www.everythingicafe.com/banner-notifications-iphone/.
One week with Locket, the lockscreen app that pays to show you ads, Nikinson, 2013, https://www.androidcentral.com/one-week-locket-lockscreen-app-pays-show-you-ads-updated.
Japanese Office Action dated Oct. 10, 2018, issued to Japanese Application No. 2017-563905.
Chinese Office Action dated Nov. 19, 2019, issued to Chinese Application No. 201680013252.5.
Second Office Action issued by the Chinese Patent Office dated Apr. 17, 2020 concerning the corresponding No. 201680013252.5.
Rejection Decision issued by the Chinese Patent Office dated Jul. 27, 2020 concerning the corresponding No. 201680013252.5.
Office Action issued by the Korean Intellectual Property Office (KIPO) dated May 27, 2020 concerning the corresponding KR 10-2017-0051423.
Decision of Refusal issued by the Japanese Patent Office dated Jun. 12, 2019 concerning the corresponding No. 2017-563905.
Re-examination report issued by the Japanese Patent Office dated Jan. 14, 2020 concerning the corresponding No. 2017-563905.
Decision to Grant of corresponding Korean Patent Application No. 10-2017-0051423 dated Nov. 20, 2020.
Decision to Grant of corresponding Chinese Patent Application No. 201680013252.5 dated Jan. 14, 2021.

* cited by examiner

INFORMATION PROVIDING METHOD USING MOBILE DEVICE

CROSS-REFERENCE TO RELATED APPLICATIONS

This application is a continuation of U.S. application Ser. No. 15/554,196 filed Aug. 28, 2017, which is a national stage of International Application No. PCT/KR2016/001972 filed Feb. 28, 2016, which claims the benefit of Korean Application No. 10-2015-0028758, filed Mar. 1, 2015, in the Korean Intellectual Property Office, the disclosures of which are incorporated herein by reference.

TECHNICAL FIELD

The present disclosure relates to a method of providing information through a mobile device.

BACKGROUND OF THE INVENTION

There are various methods to provide information using a mobile device. Generally, an application that can be installed on the user's mobile device is provided and a user provides relevant information when running the application. However, the user should operate the application to provide information, which restricts using the method. Lately, information, especially an application that provides advertisement, has been used on the smartphone's lock screen. Whenever the user activates the mobile device, the information of the corresponding application is exposed to the user, such that information providers can provide such information more efficiently.

DISCLOSURE

Technical Problem

Providing information using a lock screen is an efficient way to provide information from the perspective of the information provider. However, the information which is supplied to the user each time the mobile device is activated deteriorates user convenience.

Technical Solution

Provided is a method of providing information through a mobile device, which includes:
receiving an activation input converting the mobile device from a sleep state to an activation state;
determining whether or not the activation input is made within a predetermined time range;
determining whether or not the activation input is a first activation input; and
outputting an information providing screen through a display activated according to the activation input, where the outputting of the information providing screen is performed when the activation input is the first activation input and is made within the predetermined time range.

Advantageous Effects

Information is provided only during the first activation occurring within a predetermined time range and consequently user convenience can be maintained while providing information.

EMBODIMENTS

Figure 1:
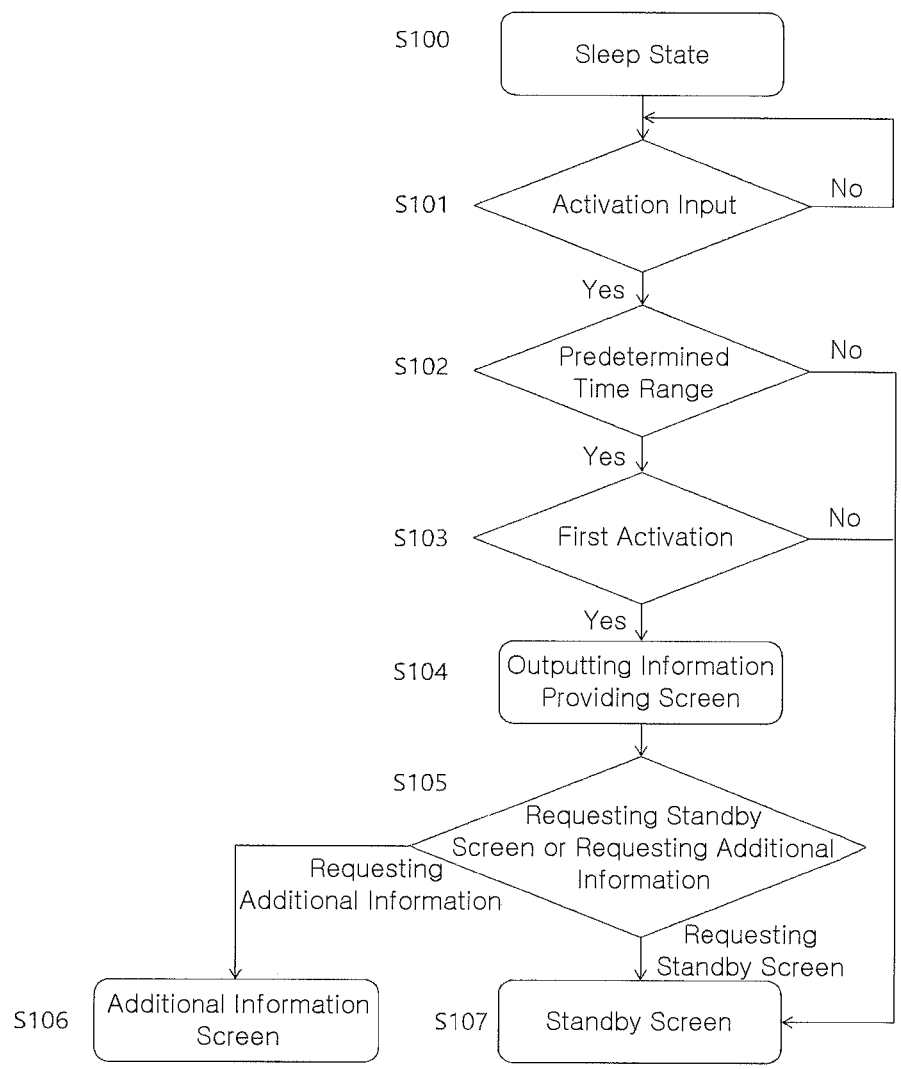
FIG. 1 is a view illustrating a process according to an embodiment of the present disclosure.

Hereinafter, an embodiment is described with reference to FIG. 1. The description is intended to illustratively describe embodiments and the scope of the invention is not restrictive thereto, but based on the appended claims. All such changes, replacements, modifications, or other combinations fall within the true spirit and scope of the present invention.

Hereinafter, it is described using a cellular phone as the example of the mobile device. However, the mobile device is not limited thereto. The mobile device according to an embodiment may include portable media, e.g., the cellular phone, a smart phone, phablet, laptop, or a personal digital assistant (PDA), which can provide information The mobile device is in a sleep state at step S100 of FIG. 1. The sleep state of the mobile device indicates a state in which its power is turned on, but the display thereof is turned off. Normally, the display of the mobile device is switched off to save a battery when the mobile device is not used for a period of time. As such, the power is on but the display is off at the sleep state. When a user makes an input or a signal is received from the outside, the sleep state is converted into an activation state. For example, when the user touches or presses a physical button, e.g., a home button, or touches a screen, the sleep state may be converted into the activation state. Alternatively, when the mobile device receives a call or a text message, it can be converted into the activation state even without the user's input.

An activation input is received from a user at step S101. The activation input may be a step of inputting a physical button of the mobile device, e.g., a home button. The physical button may be placed in a portion of the surface where the display is placed, especially at a lower portion of the display, but it is not limited to be placed therein. Rather, the physical button can be placed at various places, such as a side portion, a rear portion, or an upper side portion of the mobile device. Also, the activation input may be performed not only by the physical button, but also by a method such as a display touch. It is determined at step S101 whether or not the activation input is made. The sleep state is maintained when there is no activation input, but the procedure proceeds to step S102 when the activation input is made.

At step S102, it is determined whether or not the time when the activation input is performed is within a predetermined time range. The predetermined time range, which was previously set, may be set, e.g., from 5 AM to 10 AM. The predetermined time range may be set by a user or by an operating system of the mobile device, and can be changed as necessary. There may be multiple predetermined time ranges. For example, a first time range is from 5 AM to 10 AM, a second period is from 11 AM to 2 PM, and a third period is from 4 PM to 7 PM. The predetermined time range is not limited by its length or frequency. For example, in case of setting 24 hours, the activation input may be provided once a day. When setting three times, e.g., morning, afternoon, and evening, the activation input can be provided three times a day.

When the activation input is not made within the predetermined time range, the procedure proceeds to step S107. Accordingly, if the activation input is made when a user does not want (to be disturbed), it moves to a standby screen or lock screen according to a normal process.

When the activation input is made within the predetermined time range, the procedure proceeds to step S103.

At step S103, it is determined whether or not the activation input is a first activation input. If the activation input is not the first activation input, the procedure proceeds to step S107. When it is determined that the activation input is the first activation input, the procedure proceeds to step S104 in which an information providing screen is outputted.

Accordingly, according to an embodiment of the present disclosure, the information providing screen is only outputted in response to the first activation input performed during the predetermined time range. For example, when the predetermined time range is set from 5 AM to 10 AM, the information providing screen is outputted only for the first activation request which is performed during this time range. In general, in the case of providing advertisement or information using a lock screen, the advertisement or information is provided each time the user activates the screen, which causes inconvenience to a user. Users may want to obtain necessary information at a necessary moment without disturbing the use of the mobile device. According to an embodiment of the present disclosure, the information is only provided in response to the first activation request conducted during the predetermined time range. Thus, useful information can be provided without disturbing the user's normal usage pattern. For example, information such as headline news or weather may be provided for the first activation request conducted from 5 AM to 10 AM. Afterwards, it directly moves to a standby screen without the information providing screen according to a normal process when the activation request is made thereafter, which removes the output of unnecessary screens.

The information may include weather, clothes, transportation, news, or advertisement. The information is not limited to these examples and may include various information. In addition, the information may be changed depending on a preset time range. Various information may be provided differently depending on the preset time range, such as weather or news information in the morning, restaurant information during a lunch time, and information related to performances or events in the evening. Also, the information may be provided according to categories that the user set. For example, information the user categorized as an interest can be selectively provided. In addition, according to the user related information, e.g., the user's sex or age, different information may be provided so as to provided user-customized information or advertisement.

The information providing screen according to another embodiment of the present disclosure is not limited to the first screen, but to a preset number of screens. For example, it is not that the information is outputted once within the predetermined time range, but a predetermined number of information providing screens can be outputted, such as twice or three times.

The information providing screen at step S104 may be a separate additional screen output or may be outputted on the lock screen. The information providing screen is not limited to these. The information providing screen at step S104 may include an information display portion, a standby screen request interface, an unlock interface, or an additional information request interface. For example, the user confirms the information on the information providing screen and then moves to the standby screen. When the user wants to know more details about the information, the user can proceed to the additional information screen. In addition, the screen provided at step S104 is a first screen. The first screen indicates the screen first provided when the mobile device is converted from the sleep state into the activation state, or when the display is converted into the on state from the off state. Typically, a lock screen is provided as a first screen to prevent an input error or a standby screen is provided without the lock screen. As such, the user needs to pass through three steps, e.g., a lock screen, a standby screen, and the execution of an application, to access the application or to obtain information. However, when providing information through a first screen, specific information, the execution of an application, or a screen that a particular application provides is provided on the screen the user first recognizes, and thus, the user accessibility becomes easier. However, providing information through a first screen is advantageous and easy to the information providers, e.g., application providers or mobile device operating system providers, but it causes inconvenience to the user because the user should enter the standby screen through intermediate steps every time. According to an embodiment of the present disclosure, the information is only provided in response to the first activation which is conducted during the predetermined time range. Afterwards, since it proceeds to the normal standby screen or lock screen upon receiving an activation request, both user convenience and efficiency for information providers can be improved.

A request for a standby screen or a request for additional information may be received at step S105. The request may be implemented through a touch interface. However, the request is not limited thereto and may be modified to use various other selection methods which can be implemented in the mobile device. Upon receiving a request for a standby screen at step S105, it proceeds to step S107. An example of the request for a standby screen may be a request for unlocking. the standby screen is a fundamental screen for users to use the mobile device, in which various applications are arranged in a form of icons. The user may execute the application for desired job on the standby screen. Upon receiving additional information at step S105, for example, when the user requests additional information due to an interest in the information provided at step S104, it proceeds to step S106 for an additional information screen. The additional information screen may be webpage access through a hyperlink or the operation of a relevant application. The additional information screen is not limited thereto and may be modified to use various other information providing screens. Thus, the user confirms the information providing screen at step S104, and then requests additional information or chooses proceeding to the standby screen as necessary.

Figure 2:
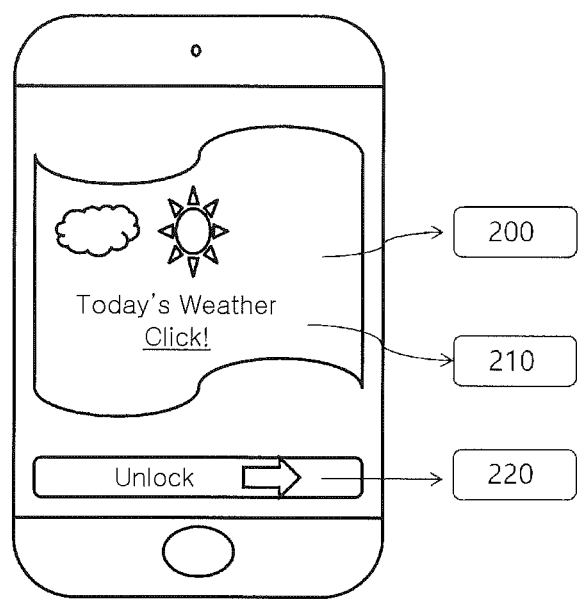
FIG. 2 is a conceptual view illustrating an output screen according to an embodiment of the present disclosure.

FIG. 2 illustrates an example of step S104. The information providing screen may include an information output portion 200, an additional information request interface 210, and a standby screen request interface 220. The additional information request interface 210 and the standby screen request interface 220 may be a touch based input, but are not limited thereto. In addition, the information output portion 200 and the additional information request interface 210 may be independently provided in a separate region. However, they are not limited to and may be provided in a same region. For example, in case of touching an area of the information output portion, the step of requesting additional information may be performed.

The information may be provided depending on the location information of a user, according to an embodiment of the present disclosure.

For example, a condition may be set depending on the location information of a user, instead of the predetermined time range, at step S102 of FIG. 1. Specifically, when the user sets such a location as home or work, the information may be provided only during the first activation performed in the location. Following procedures may be same as those described above in relation to the embodiments. Further, the time and location may be simultaneously used to set the conditions at step S102.

An embodiment of the present disclosure, for example, may be performed through a particular user application. For example, the user may install in the mobile device to preform the embodiments of the present disclosure. The user may see the information that the application provides during the first activation conducted within the predetermined time range. If the user desires to see additional information, it may enter a step of requesting additional information. Otherwise, the user checks the information provided during the first activation and then moves to the standby screen. The user application may allow the user to set the time range that the user wants and provide adequate information during the corresponding time range. The application providers may encourage the users to use the application to make it easier the access to the application that they provide.

In addition, the embodiment of the present disclosure may be installed in the operating system of the mobile device. The embodiment of the present disclosure can be implemented through the operating system (OS) operating the mobile device.

What is claimed is:

1. A method of providing information through a mobile device, the method comprising:
    receiving an activation input converting the mobile device from a sleep state to an activation state;
    determining whether or not the activation input is made within predetermined location information;
    determining whether or not the activation input is a first activation input; and
    activating a display of the mobile device according to the activation input,
    wherein at the activating of the display,
    when the activation input is the first activation input made within the predetermined location information, a screen including an information providing screen is output on the activated display, and
    when the activation input is not made within the predetermined location information, or when the activation input is not the first activation input, a standby screen or a lock screen not including the information providing screen is output on the activated display,
    wherein the information providing screen is a first screen the mobile device provides according to conversion into the activation state, the information providing screen comprising:
    an information output portion;
    an additional information request interface for requesting additional information; and
    a standby screen request interface for conversion into the standby screen.

2. The method of claim 1, wherein the information providing screen is provided on the lock screen of the mobile device.

3. The method of claim 1, further comprising:
    outputting an additional information screen to provide additional information when there is an input of the additional information request interface.

4. The method of claim 1, wherein the information providing screen includes an advertisement.

5. The method of claim 1, wherein at the determining of whether or the activation input is made within the predetermined location information, a location at which the activation input is received is compared with the predetermined location information previously set, wherein it is determined whether or not the activation input is the first activation input when the location at which the activation input is received is within the predetermined location information, and the standby screen is output when the location at which the activation input is received is not within the predetermined location information.

6. The method of claim 5, wherein the information providing screen is output when the activation input is the first activation input and the standby screen is output when the activation input is not the first activation input.

* * * * *